UNITED STATES PATENT OFFICE.

JOHN G. SHILVOCK, OF CHICAGO, ILLINOIS.

COMPOSITION FOR ALUMINUM PAINT.

1,411,673. Specification of Letters Patent. Patented Apr. 4, 1922.

No Drawing. Application filed October 3, 1921. Serial No. 505,183.

*To all whom it may concern:*

Be it known that I, JOHN G. SHILVOCK, a citizen of the United States, and a resident of Chicago, in the county of Cook and State of Illinois, have invented certain new and useful Improvements in Composition for Aluminum Paint; and I do hereby declare that the following is a full, clear, and exact description thereof, reference being had to the accompanying drawings, and to the characters of reference marked thereon, which form a part of this specification.

This invention relates to a novel liquid composition for aluminum paint with which aluminum, as aluminum bronze, is adapted to be mixed to constitute the body of the paint, the composition furnishing a carrier or vehicle for aluminum pigment and also neutralizing and fixative agents to prevent deterioration of the aluminum in the mixed paint and produce a good bond to hold the pigment after the paint has been applied and the carrier or vehicle has evaporated.

The purpose of the invention is to produce a composition for aluminum paint in which the aluminum will not disintegrate in the mixed, wet paint and which, when the paint is applied and dried, produces a highly desirable coating, practically free from deterioration and which maintains the original luster or sheen of the freshly mixed paint.

Said composition is composed of a volatile mineral carrier or vehicle, a mineral fixative agent to set or hold the pigment when mixed therewith, and a neutralizing fixative agent which prevents the pigment from disintegration when the latter is incorporated with the composition, the said fixative agent and neutralizing fixative agent being soluble in the carrier in such manner that the properties or constituents of the composition can be maintained over long periods of time without change.

The composition herein disclosed comprises a carrier made of benzol or its homologues, such for instance, as toluol, solvent naphtha, and xylol, a mineral resin as a fixative agent, and stearic acid as a neutralizing fixative agent. These constituents, when mixed, produce a clear, amber liquid, with the said fixative agent and neutralizing fixative agent soluble in the carrier and this liquid maintains its clear consistency over long periods, the fixative agent and neutralizing fixative agents being neutral to each other and to the carrier.

The carrier can be recovered by the distillation of light oils obtained by distillation of coal tar or water gas tar, or it can be obtained by scrubbing coal gas and carburetted water gas. The fixative agent may be paracoumarone, coumarone, or benzofurane resin, and is a mixture of paracoumarone, para-indene, and the polymers of other hydrocarbons found in coal tar of various melting points. The neutralizing fixative agent or stearic acid can be produced by known processes, one of which is saponification with caustic soda in an autoclave and another the Twitchel process.

In practice I have obtained useful results in mixing the constituents of the composition in the proportions of seventy per cent of the carrier, twenty per cent of the fixative agent, and ten per cent of the neutralizing fixative agent, but these proportions can be varied to suit different conditions which the composition and the paint meets in use. When the paint embodying said composition is applied, the carrier rapidly volatilizes and leaves the pigment and fixative and neutralizing fixative agents on the surface.

I have found in practice that synthetic mineral resin, hereinabove referred to, is more neutral and durable than any other known resins, and that said fixative agent, when combined with the pigment and neutralizing fixative agent, produces a strong bond between the pigment particles and thus produces a reliable coating. The action of the stearic acid on the aluminum bronze is to avoid disintegration of the pigment and to retain the original luster or sheen of the paint.

I claim as my invention:

1. A mixing composition for aluminum paint comprising a volatile mineral carrier, stearic acid, and a resin.

2. A mixing composition for aluminum paint comprising a volatile mineral carrier, a synthetic mineral resin, and stearic acid.

3. A mixing composition for aluminum paint comprising a benzol hydrocarbon, a mineral resin, and stearic acid.

4. A mixing composition for aluminum paint comprising a benzol, hydrocarbon, a neutral mineral resin, and a neutralizing fixative agent which makes the resultant mixture neutral to aluminum bronze.

5. A mixing composition for aluminum paint composed of a benzol hydrocarbon, a synthetic mineral resin, and stearic acid, in substantially the proportions of 70 per cent of the hydrocarbon, 20 per cent of the resin, and 10 per cent of the stearic acid.

In witness whereof I claim the foregoing as my invention, I hereunto append my signature this 26th day of September, 1921.

JOHN G. SHILVOCK.